United States Patent
Speranza et al.

[11] Patent Number: 4,761,465
[45] Date of Patent: Aug. 2, 1988

[54] DIFUNCTIONAL ISOCYANATE-TERMINATED POLYOXYALKYLENE DIAMINE PREPOLYMERS AND POLYMER COATINGS APPLICATIONS

[75] Inventors: George P. Speranza, Austin; Jiang-Jen Lin, Round Rock; Michael Cuscurida, Austin, all of Tex.

[73] Assignee: Texaco Inc., White Plains, N.Y.

[21] Appl. No.: 78,314

[22] Filed: Jul. 27, 1987

[51] Int. Cl.$^4$ .............................................. C08G 18/80
[52] U.S. Cl. ...................................... 528/45; 528/49; 528/68; 528/76
[58] Field of Search ..................... 528/45, 49, 68, 76

[56] References Cited
U.S. PATENT DOCUMENTS
4,686,242  8/1987  Turner et al. .................. 528/68

Primary Examiner—Maurice J. Welsh
Attorney, Agent, or Firm—Jack H. Park; Kenneth R. Priem; Cynthia L. Kendrick

[57] ABSTRACT

Diisocyanate and polyoxyalkylene diamine reaction products which contain as the principle reaction component, a diamine having the formula:

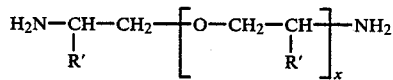

wherein R' independently represents hydrogen or methyl and x is a number having an average value of at least 1 to about 60 and a diisocyanate of the formula:

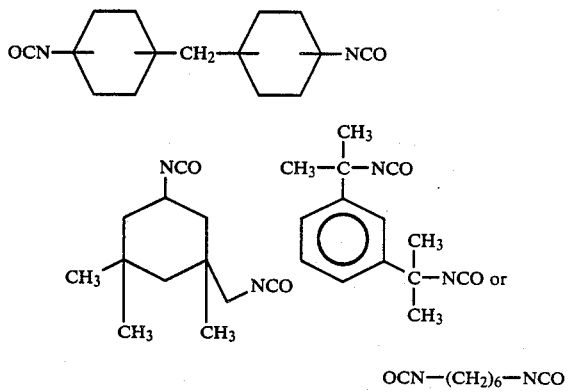

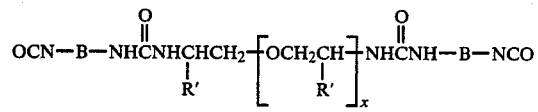

The products of the invention are obtained by reacting a polyoxyalkylene diamine with an excess of diisocyanate in the presence of a polar solvent to obtain products with the following general structures:

$$OCN-B-NHCNHCHCH_2\left[OCH_2CH\right]_x NHCNH-B-NCO$$

where B is alkyl group from diisocyanates.

These products and the corresponding blocked isocyanate prepolymer are further used to prepare coatings by reaction with polyoxyalkylene polyamine.

17 Claims, No Drawings

DIFUNCTIONAL ISOCYANATE-TERMINATED POLYOXYALKYLENE DIAMINE PREPOLYMERS AND POLYMER COATINGS APPLICATIONS

FIELD OF THE INVENTION

This invention relates to difunctional isocyanate prepolymers. More particularly this invention relates to novel difunctional isocyanate prepolymers synthesized from polyoxyalkylene diamines and diisocyanates. Still more particularly, this invention relates to novel difunctional isocyanate-terminated polyoxyalkylene diamines prepared by reacting at least about two mole equivalents of a diisocyanate with a polyoxyalkylene diamine in the presence of hindered alcohol solvents. The novel products contain two active isocyanate groups linked by at least two urea and polyoxyalkylene moieties. Variations of the process allow for synthesizing free and "blocked" isocyanate prepolymers. The reaction is preferably conducted under nitrogen atmosphere at a temperature within the range of about 0° C. to 100° C.

The blocked isocyanate coating systems had excellent storage stability and compatibility, and the heat cured films made therefrom had excellent properties. Finally, the blocked coatings can be cured with novel polyoxyalkylene amines to provide improved storage stable coating systems. Here, the isocyanate prepolymers used affected the hardness of the coating.

BACKGROUND OF THE INVENTION

The reaction of isocyanates with amines is known in the art and is an extremely fast reaction. It has only been recently that higher molecular weight diamines could be made to react with diisocyanates in a controlled fashion. Work in this area led to the Reaction Injection Molding (RIM) process for the preparation of polyurea plastics.

Reaction of polyisocyanates with polyamines that were soluble or partially soluble in water has often led to gel formation though it might have been expected there would be advantages to carrying out the reaction in water, in that the water would serve as a heat sink.

In contrast to isocyanate-amine reaction, the reaction of alcohol-isocyanate proceeds at a slower rate. In general, the industrial application of polyurethane synthesis employs a catalyst, such as an organotin compound. The isocyanate polymers prepared from polyol and isocyanate are well-known and used widely in commercial processes. (see J. H. Saunders and K. C. Frisch, High Polymer Vol. XVI, polyurethanes: Chemistry and Technology (part 1) Interscience publishers (1962)).

The preparation and uses of polyol-isocyanate prepolymers can be found in references in the art.

Chung et al. disclose in U.S. Pat. No. 4,590,254 a poly(urethane-urea) which is prepared by reverse addition of an isocyanate-terminated prepolymer to an organic medium containing a chain extender such as hydrazine.

In U.S. Pat. No. 4,617,349, Nasu et al. disclosed a urethane resin composition which comprises a polyisocyanate component having from 20/80 to 80/20 of a weight ratio on a solid basis of an α, α, α', α'- tetramethyl-xylylene diisocyanate derivative to a hexamethylene diisocyanate derivative and (b) an acrylic polyol.

In U.S. Pat. No. 4,614,787 there is disclosed a method for preparing a wound dressing having a drug dispensed throughout a polyurethane matrix that is the reaction product of: (a) an isocyanate-terminated prepolymer formed by the reaction of isophorone diisocyanate and a macroglycol and (b) a monomer containing hydroxyl and vinyl groups.

In U.S. Pat. No. 4,611,043 there is disclosed a coating composition prepared from (a) an isocyanate terminated prepolymer which comprises the reaction product of at least one polyurethane-forming reagent containing a plurality of isocyanate groups and at least one polyfunctional polyhydric alcohol and (b) dicyclopentenyl alcohol.

In U.S. Pat. No. 4,605,504 is disclosed a method for production of the polyetherurethane particles by forming a prepolymer and subjecting the dissolved prepolymer to the presence of a 2-methylpiperazine suspension to allow polymerization to occur.

The above prepolymers were generally prepared from polyol and diisocyanate using tin catalyst and elevated reaction temperatures.

U.S. Pat. No. 4,609,718, discloses a coating composition consisting essentially of a linear acrylate-terminated polyurethane oligomer, including urea groups, introduced by the presence in the oligomer of a reaction product with an isocyanate functionality of about 30% to about 90% by weight of the acrylate-terminated oligomer of a polyoxyalkylene diamine having a molecular weight in the range of from about 1000 to about 8000. The mentioned isocyanate-terminated polyoxyethylene diamine was a high-molecular diamine with reactions using dibutyl tin dilaurate catalyst at elevated temperature.

Discriptions and uses of "blocked" isocyanates can be found in the following applications:

U.S. Pat. No. 4,495,229 discloses a polyurethane, one component, heat-cured coating which is stable in storage and is hardened above a temperature of about 120° C. The coating comprises a polyol and a blocked isocyanate.

In an article titled "Blocked Isocyanates in Coatings" by Mobay Chemical Corp., presented at "Water-Borne and Higher Solids Conference", Feb. 5-7, 1986, New Orleans, La., there are outlined commercial areas where specific products based on blocked polyisocyanates exhibit possible uses.

It would be a distinct advance in the art if a novel polyoxyalkylenediamine containing isocyanate groups could be prepared without a metal catalyst wherein the hardness of cured coatings was controllable and storage stability was improved. It would be an advance in the art if this could be accomplished by a method which avoided gel formation. In addition, it would be desirable if the products were colorless and the process could be carried out at low temperatures. Uses of compositions with such desirable properties in coatings would be apparent.

SUMMARY OF THE INVENTION

It is an object of the present invention to provide a method of preparing a polyoxyalkylene diamine molecule having a novel structure which may comprise an isocyanate-capped polyoxyalkylenediamine or a blocked isocyanate, and also to provide a method which avoids gel formation.

More specifically, in accordance with the present invention, there is provided a process for the preparation of a diisocyanate-prepolymer which comprises reacting a polyoxyalkylenediamine and an isocyanate in the presence of an alcohol solvent at room temperature and atmospheric pressure. In one embodiment of this invention certain alcohol solvents are used which retard the rate of reaction of the diamines and diisocyanates and form isocyanate capped polyoxyalkylenediamines. In another embodiment blocked isocyanates are prepared from isocyanate-terminated polyoxyalkylene prepolymers. The prepolymer may be blocked with methyl ethyl ketone oxime or other blocking agents and heat cured with conventional polyamines. The blocked isocyanate coating systems had excellent storage stability and the heat cured film had excellent properties.

DESCRIPTION OF THE PREFERRED EMBODIMENTS

According to the present invention a polyoxyalkylenediamine having isocyanate groups can be obtained by a controllable reaction and without undesirable gel formation. In one embodiment isocyanate capped diamines are prepared using t-butanol or isopropanol solvents. In this embodiment the use of the alcohol solvent retarded the reaction rate of the diamines and diisocyanates and formed isocyanate capped diamines. In another embodiment isocyanate-terminated polyoxyalkylene prepolymers were made by a similar reaction and blocked with methyl ethyl ketone oxime or other blocking agents and heat cured with conventional polyamines. The reaction is very rapid at room temperature. The products are colorless. It is known that the reaction of isocyanates with amines is extremely fast. Only recently could higher molecular weight diamines be made to react with diisocyananates in a controlled fashion.

The novel isocyanate prepolymers of the present invention are urea-linked polyoxyalene isocyanantes which contain as the principle reaction components a diisocyanate of the formula:

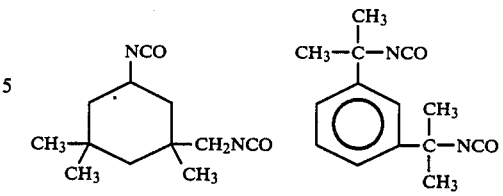

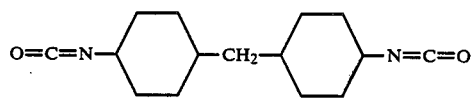

and an appropriate diamine of the group of polyoxyalkylene diamines having the formula:

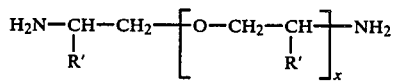

wherein R' independently represents hydrogen or methyl and x is a number having an average value of about 1 to 60.

In the embodiment where isocyanante capped polyoxyalkylene ureas are produced, the use of t-butanol or i-propanol as solvents made it possible to prepare isocyanate capped polyoxyalkylene diamines. A description of diamines follows, under the subtitle THE DIAMINE REACTANTS. The following structures demonstrate capped products formed by reaction of JEFFAMINE ® D-400 and the appropriate isocyanate.

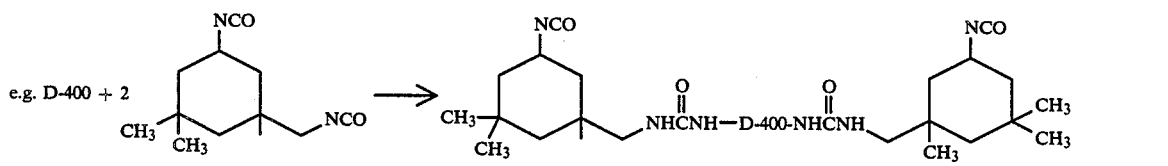

(2)
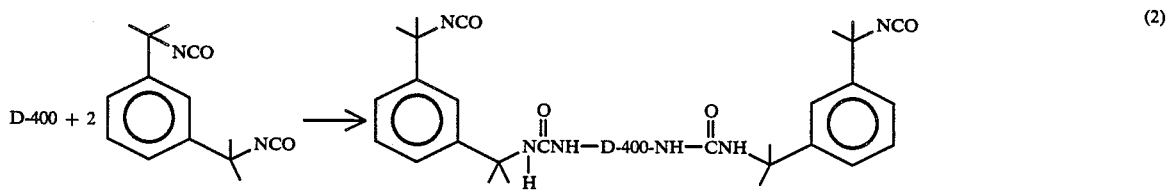

(3)

(4)

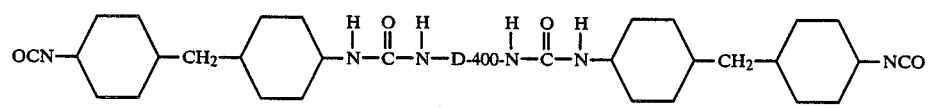

The isocyanate-terminated polyoxyalkyleneamine prepolymer may be blocked with methyl ethyl ketone oxime or other blocking agents and heat cured with conventional polyamines. The isocyanate blocked coatings can also be cured with novel polyoxyalkyleneamines to provide a coating system with improved stability. In addition the hardness of the coating can be varied by changing the diisocyanate.

The Isocyanate

The isocyanate component for the present invention may be any suitable isocyanate having the desired functionality. Diisocyanates work well in the process. Aliphatic organic diisocyanates are preferred. Although diisocyanates are referred to with preference other higher polyisocyanates can be used in combination with diisocyanates and/or monoisocyanates. Examples of suitable aliphatic diisocyanates are aliphatic diisocyanates such as 1,4-tetramethylene diisocyanate, trimethylhexane diisocyanate, 1,6-hexamethylene diisocyanate, 1,4-cyclohexyl diisocyanate, isophorone diisocyanate, xylylene diisocyanate, m- and p- tetramethylxylylene diisocyanate, 4,4'methylene-bis(cyclohexyl isocyanate), 2,2,4-trimethylhexamethylene diisocyanate, 2,4,4-trimethylhexamethylene diisocyanate and mixtures thereof. Substituted organic polyisocyanates can also be used in which the substituents are nitro, chloro, alkoxy and other groups which are not reactive with active hydrogens and provided the substituents are not positioned to reach the isocyanate group unreactive or adversely affect the intended use of the diamine.

Preferred diisocyanates for producing novel isocyanate prepolymers are isophorone diisocyanate, 1,6-hexamethylene diisocyanate and tetramethylxylene diisocyanate. Isophorone diisocyanate was used in many of the examples.

In the embodiment for producing blocked isocyanates from isocyanate terminated polyoxyalkyleneamine prepolymers and blocked isocyanate coatings the preferred diisocyanates are aliphatic diisocyanates including, but not limited to, tetramethylxylene diisocyanate and isophorone diisocyanate.

The Diamine Reactant

In general the diamine starting material may be defined as a polyoxyalkylene diamine. One group of appropriate polyoxyalkylene diamines that may be used are those sold by Texaco Chemical Co. as JEFFAMINE ® D-series products having the formula:

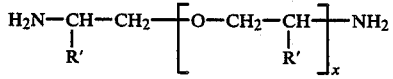

Wherein R' represents hydrogen or methyl and x is a number having an average value of about 1 to about 60.

Representative polyoxypropylene diamines having this structure and which are sold by Texaco Chemical Co. are as follows:
JEFFAMINE ® D-230, x=2–3
JEFFAMINE ® D-400, x=5–6
JEFFAMINE ® D-2000, x=~33
JEFFAMINE ® D-4000, x=~60

The aforementioned JEFFAMINE ® D-series amines appear to be well suited to both the embodiment for producing isocyanate terminated urea and the corresponding blocked isocyanate coatings.

Solvents

In the method of this invention the alcohol solvent is essential for controlling this reaction and, at the same time, avoiding gel formation.

Suitable solvents are those which are less reactive toward isocyanate groups than amino compounds. Generally suitable solvents are polar or those having a high dielectric constant.

Examples of suitable polar solvents include methanol, ethanol, isopropanol, butanol and amyl alcohol. Among the solvents studied were methanol, ethanol, i-propanol and t-butanol. Good results were obtained using i-propanol and t-butanol.

In the embodiment wherein the desired result is the production of isocyanate capped polyoxyalkylene urea the preferred solvents are t-butanol or i-propanol solvents. Preparation of isocyanate-capped polyoxyalkylene ureas

Preparation of isocyanate-capped polyoxyalkylene ureas

It has been discovered in accordance with the present invention that an isocyanate-capped polyoxyalkylene urea product is preferentially formed when an excess diisocyanate is reacted with an polyoxyalkylene diamine under nitrogen atmosphere at a temperature within the range of about 0° C. to 100° C. for a reaction time within the range of about 1 to about 10 hours. Normally, the reaction will go to completion after a reaction time within the range of about 1 to about 4 hours.

The use of t-butanol or i-propanol solvents retard the reaction rate of the polyoxyalkylene amines and diisocyante and make it possible to prepare isocyanate capped JEFFAMINE ® Diamines according to the following reaction:

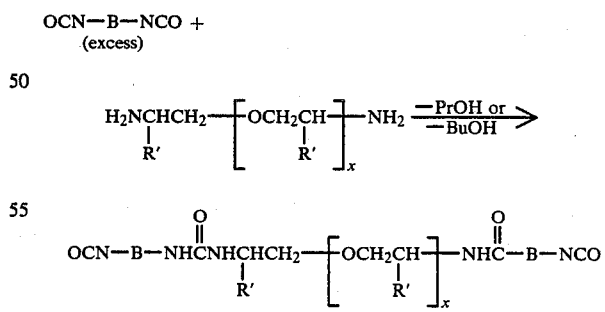

Wherein R' independently represents hydrogen or methyl or ethyl, x is a number having an average value of about 1 to about 60 and B represents the nucleus of an alkyl diisocyanate; for example, structures A,B and C illustrate a nucleus from isophorone diisocyanate, m-tetramethyl xylene diisocyanate or 1,6-hexamethylene diisocyanate respectively.

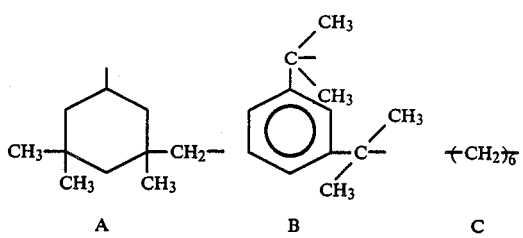

In the embodiment of this invention wherein blocked isocyanates are prepared from isocyanate terminated polyoxyalkyleneamine prepolymers, the prepolymers are prepared in the manner described previously by the reaction of an excess of diisocyanate with a polyoxyalkyleneamine in an alcohol solvent. The prepolymer can be blocked with conventional blocking agents such as methyl ethyl ketone oxime.

Isocyanate-terminated polyoxyalkyleneamine prepolymers were made by reaction of an excess of the diisocyante with the polyoxyalkyleneamine in an equivalent ratio of about 2-4 in alcohol solvent as illustrated by the following equation, using TMXDI and JEFFAMINE ® D-400 as an example:

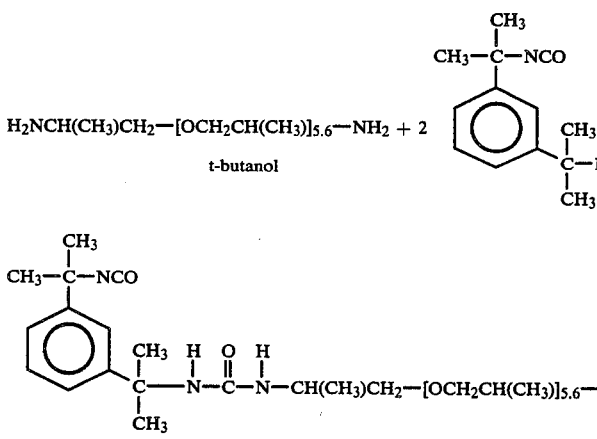

The isocyanate-terminated polyoxyalkyleneamine prepolymer may be blocked with methyl ethyl ketone oxime or other blocking agents. Useful isocyanate blocking agents include, for example, phenols, amides, malonates, acetoacetates and sodium bisulfite. The blocked isocyanates can be heat cured with polyamines.

The improvements of this system over similar work in the art include the following:
1. Aliphatic isocyanates are used to make non-gelled products.
2. No catalysts are required.
3. Coating systems have excellent stability.

As mentioned above the blocked isocyanates can be heat cured with conventional polyoxyalkyleneamines.

In a variation of this embodiment novel polyoxyalkyleneamines can be used as the curing agent to make coatings, wherein the hardness of the coating may be varied by changing the diisocyanate and polyoxyalkyleneamines.

The present invention will be further illustrated by the following examples which are only for the purpose of illustration and are not to be regarded as limiting the invention in any way.

EXAMPLE 1

Isophorone Diisocyanate (IPDI) and JEFFAMINE ® D-2000 (2:1) Adduct

To a 500 ml 3-necked flask equipped with a thermometer, additional funnel, stirrer and nitrogen-inlet line, was charged isophorone diisocyanate (44.4 g 0.20 M) and t-BuOH (44.4 g). The mixture of D-2000 (200 g 0.1M) in t-BuOH (50 g) was added dropwise at 21°-33° C. over a two hour period of time. The colorless, viscous product was analyzed for isocyanate content and it was found to be 0.49 meq/g (calc. 0.59 meq/g).

EXAMPLE 2

1,6-Hexamethylene Diisocyanate and D-2000 (2:1) Adduct

To a 500 ml 3-necked flask equipped with thermometer, addition funnel, stirrer and nitrogen-inlet line, was charged 1,6-hexamethylene diisocyanate (Mobay, Desmodur H, 29.6 g, 0.2 M). At 8°-20° C. temperature (cooling by wet-ice bath), the mixture of D-2000 (200 g, 0.1M) and t-BuOH (150 g) was added into the flask dropwise through an additional funnel, over a four hour period of time. A clear solution was obtained. After standing at room temperature overnight, the solution turned into a soft solid with an analysis for isocyanate of 0.81 meq/g.

EXAMPLE 3 m-tetramethyl xylene diisocyanate (TMXDI)+D-2000 (2:1) Adduct

Following the above procedures, the mixture of JEFFAMINE ® D-2000 (150 g, 0.075 M) and t-BuOH (200 g) was added to tetramethylxylene diisocyanate (36.6 g, 0.15 M) dropwise at 5°-15° C. The resulting viscous, colorless solution was analyzed to contain 0.68 meq/g for isocyanate.

EXAMPLE 4

TMXDI and JEFFAMINE ® D-400 (2:1) Adduct

Following the above procedures, the mixture of JEFFAMINE ® D-400 (100 g 0.25 M) and t-BuOH (100 g) was added to tetramethylxylene diisocyanate (122 g, 0.5 M) at 5°-17° C. The resulting colorless, viscous solution was analyzed to contain 1.31 meq/g isocyanate.

EXAMPLE 5

IPDI and JEFFAMINE ® D-400 (2:1) Adduct

Following the typical experimental procedures, the mixtures of D-400 (42 g, 0.105 M) and t-BuOH (90 g) were added to isophorone diisocyanate (46.6 g, 0.21 M) at 17°–25° C. over a 1 hour period. The resulting colorless solution was subjected to a vacuum line to recover solvent. The isocyanate D-400 adduct was obtained as semisolid.

Examples 6 through 10 illustrate the method of preparing novel blocked isocyanates.

EXAMPLE 6

Preparation of the Blocked Isocyanate

Into a 500 ml 3-necked flask equipped with a stirrer, thermometer, dropping funnel, nitrogen source, and water condenser was charged 122 g (0.5 M) of tetramethylxylene diisocyanate. The diisocyanate was then cooled to 9° C. and a mixture of 100 g (0.25 M) JEFFAMINE ® D-400 and 100 g t-butanol was added dropwise over a 2.25 hour period. The reaction temperature was maintained at 9°–18° C. during this period. After a 10 minute digestion, methyl ethyl ketone oxime (43.5 g, 0.5 M) was added dropwise over a 0.4 hour period. The reaction temperature peaked at 40° C. and heating was continued for an additional 2.5 hours at 40°–55° C. The resultant product was a clear, viscous liquid which contained no free isocyanate as determined by its infrared spectra.

EXAMPLE 7

This example will illustrate the preparation of heat cured coatings using the blocked isocyanate of Example 6 and JEFFAMINE ® T-403 as the curing agent. It will further show the improved properties of these coatings as compared to those made from prior art blocked isocyanates. In other work in the art a blocked isocyanate was made by the reaction of methyl ethyl ketone oxime, with a toluene diisocyanate adduct of trimethylolpropane dissolved in propylene glycol monomethyl ether acetate (Mondur CB-601 PMA; Mobay Chemical Co.).

Coatings were prepared as follows:

Into a one-half pint wide-mouthed bottle was charged the appropriate blocked isocyanate, curing agent. A flow control agent such as beetle resin was an alternate additive. The mixture was then thoroughly mixed using a wooden spatula. A portion of the mixture was then degassed using a rotary film evaporator. Five mil films were prepared from the degassed mixture using a doctor blade. The film was then heat cured.

Compositions, details of preparation, and coating properties are shown in the following table:

| Coating No. | Sample 1 | Sample 2 |
|---|---|---|
| Composition, pbw | | |
| Blocked isocyanate of Example 6 | 123 | — |
| Prior art blocked aromatic diisocyante | — | 106.5 |
| JEFFAMINE ® D-400 | — | 43.5 |
| JEFFAMINE ® T-403 | 27 | — |
| Beetle resin | 0.075 | — |
| Ethylene glycol monoethyl ether acetate | 25 | — |
| Details of Preparation | | |
| Coating thickness, mil | 5 | 5 |
| Cure temperature, °C. (hr) | 100–105(2) | 100–105(2) |
| Properties | | |
| Pencil hardness | H | H |
| Impact resistance, in/lb | | |
| Forward | Pass 160 | Pass 160 |
| Reverse | Pass 160 | Pass 160 |
| Gloss (hrs. exposure to ultraviolet light in QUV tester) | | |
| 24 | 100.1 | 99.2 (yellowed) |
| 96 | 103.2 | 101.6 |
| 118 | 100.1 | 102.3 |
| 308 | 104.1 | 100.8 |
| 497 | 95 (non-yellowing) | 89 (dark yellow) |

EXAMPLE 8

This example will show the improved storage stability of the blocked isocyanate coating systems of this invention as compared to prior art blocked isocyanate systems.

| Storage Stability | Coating System from Example 7 | Coating System of Example 7 |
|---|---|---|
| Vis., 77° F., cps | 800 (1) | 1700 (1) |
| | 900 (14) | 8500 (8) |
| | 1000 (24) | 69400 (23) |
| | 1150 (31) | 1448000 (30) |
| | 1500 (63) | |
| | 2000 (91) | |
| | 5773 (210) | |

EXAMPLE 9

This example will illustrate the preparation of blocked isocyanates by reaction in alcohol solvent of an isocyanate-terminated prepolymer of isophorone diisocyanate and a 600 m.w. poly(oxyethyleneoxypropylene)amine (JEFFAMINE ® ED-600 with methyl ethyl ketone oxime).

Into a 1-liter 3-necked flask equipped with a stirrer, thermometer, nitrogen source, and addition funnel was charged 222 g (1 M) isophorone diisocyanate and 100 g isopropyl alcohol. The mixture was then cooled to 6° C. A solution of 322.5 g (0.5 M) JEFFAMINE ® ED-600 and 150 g isopropyl alcohol was then added over a 30 minute period keeping the reaction temperature at 6°–18° C. Methyl ethyl ketone oxime (87 g) was then added as rapidly as possible maintaining the reaction temperature at 30°–35° C. action mixture was then digested for 1.5 hours. The final product was a clear, colorless, low viscosity liquid.

EXAMPLE 10

Heat cured coatings were prepared using the blocked isocyanate described in Example 9 and JEFFAMINE ® T-403

Compositions, details of preparation, and coating properties are shown in the following table.

| Coating No. | |
|---|---|
| Composition, pbw | |
| Blocked isocyanate of Example .9 | 130.35 |
| JEFFAMINE ® T-403 | 19.65 |
| Beetle resin | 0.075 |
| Details of Preparation | |
| Coating thickness, mil | 5 |

| Coating No. | |
|---|---|
| Cure temperature, °C. | 100–110(2) |
| | 120–125(1) |
| Pencil hardness | 3B |
| Impact Resistance, in/lb | |
| Forward | Pass 160 |
| Reverse | Pass 160 |

What is claimed is:

1. A polyoxyalkylene diamine and isocyanate reaction product containing an average of two terminal isocyanate groups and having an average molecular weight of about 600 to 10,000;

said isocyanate reaction product comprising a prepolymer having been prepared by reacting an excess of diisocyanate with an polyoxyalkylene diamine having a molecular weight of about 400 or less in the presence of a alcohol solvent;

the principal isocyanate prepolymer reaction product being a diisocyanate formed by coupling each isocyanate group of said diisocyanate through a urealinkage with a terminal primary amine of said diamine;

wherein said diisocyanate reactant has the formula from the group consisting of:

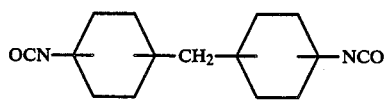

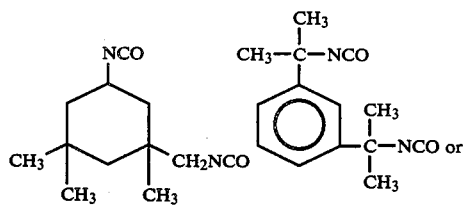

$$OCN-(CH_2)_6-NCO$$

and said polyoxyalkylene diamine has the formula:

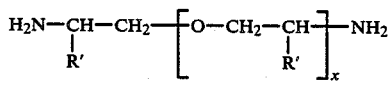

wherein R' independently represents hydrogen, methyl or ethyl and x is a number having an average value of about 1 to about 60, wherein said isocyanate prepolymer reaction product has the formula:

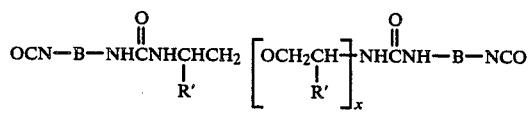

where R' is hydrogen or methyl and x is a number having an average value of about 1 to 60, B represents alkyl group from an isocyanate nucleus structure from the group consisting of:

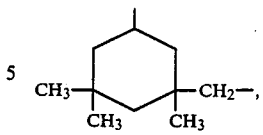

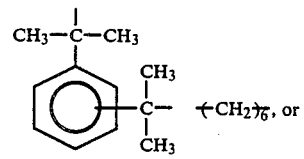

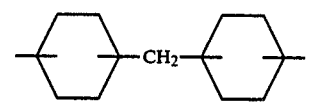

2. The product of claim 1 wherein the polar solvent is selected from the group consisting of isopropanol, t-butanol, methanol, ethanol amyl alcohol and secondary butanol.

3. The product of claim 1 wherein the diisocyanate reactant is selected from the group consisting of isophorone diisocyanate, (IPDI) 1,6-hexamethylene diisocyanate (HMDI) methylene bis (cyclohexyl) diisocyanate and tetramethylxylene diisocyanate (TMXDI).

4. The product of claim 1 wherein the polyoxyalkylene diamines are polypropylene diamines of the formula:

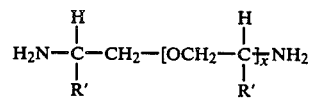

where x=1 to 60.

5. The product of claim 1 wherein said polyoxyalkylene diamine and said diisocyanate are allowed to react at 1:2 molar ratio.

6. A method of preparing a diisocyanate prepolymer which comprises reacting a diisocyanate with at least a half of a mole equivalent of polyoxyalkylene diamine at a temperature within the range of about 0° C. to about 100° C., and a reaction time of about 0.1 to about 12 hours to thereby prepare a reaction product composed principally of a diamine formed by coupling each isocyanate group of said diisocyanate through a urea linkage with a primary amine group of said polyoxyalkyelene diamine in the presence of an alcohol solvent;

said polyoxyalkylene diamine having the formula

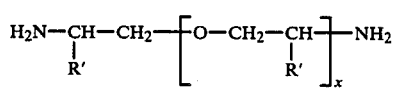

wherein R' independently represents hydrogen or methyl and x is a a number having an average value of about 1 to about 60.

7. The method of claim 6 wherein the polar solvent is selected from the group consisting of isopropanol, t-butanol, methanol, ethanol, amyl alcohol, and secondary butanol.

8. The method of claim 7 wherein the diisocyanate reactant is selected from the group consisting of isophorone diisocyanate, 1,6-hexamethylene diisocyanate, methylene bis (cyclohexyl) diisocyanate and tetramethylxylene diisocyanate.

9. The method of claim 6 wherein the molar ratio of the diisocyanate and the polyoxyalkylene diamine is 2:1.

10. A method of preparing a blocked isocyanate from an isocyanate-terminated polyoxyalkylene prepolymer wherein the isocyanate-terminated polyoxyalkylene prepolymer is formed by reacting 2 equivalents of aliphatic diisocyanate with 1 mole equivalent of polyoxyalkylenediamine in the presence of a polar solvent and subsequently adding an isocyanate blocking compound from the group consisting of oximes, phenols, amides, malonates, acetoacetates and sodium bisulfite.

11. The method of claim 10 wherein the aliphatic diisocyanate is selected from the group consisting of tetramethylxylene diisocyanate, isophorone diisocyanate and 1,6-hexamethylene diisocyanate.

12. The method of claim 10 wherein the polyoxyalkylenediamines have a molecular weight in the range of 200-4000.

13. The method of claim 10 which further comprises preparation of blocked isocyanate coatings wherein the coatings are cured using polyoxyalkyleneamines and wherein the coating hardness of the blocked isocyante coating can be varied by the use of different diisocyanates in the production of the polyoxyalkylene curing agent.

14. A blocked isocyanate prepolymer having an average molecular weight of about 600 to 10,000;
said blocked isocyanate prepolymer having been prepared by blocking a polyoxyalkyleneamine prepolymer with a blocking agent selected from the group consisting of phenols, amides, malonates, oximes, acetoacetates and sodium bisulfite, and curing the product with a conventional polyamine;
said prepolymer having been prepared by reacting excess diisocyanate with a polyoxyalkyleneamine in an alcohol solvent.

15. The blocked isocyanate of claim 14 wherein the choice of diisocyanate reactant in the prepolymer affects the hardness of the coating, said diisocyanate reactants being selected from the group consisting of isophorone diisocyanate, hexamethyl xylene diisocyanate, 1,6-hexamethylene diisocyanate, and methylene bis(cyclohexylisocyanate).

16. The product of claim 14 where in said blocked isocyanate prepolymer has the following structure:

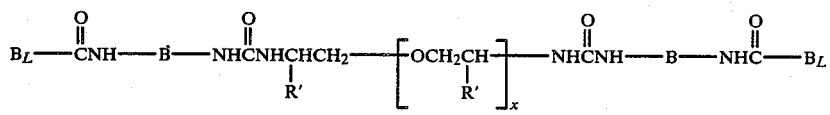

where R' is methyl or hydrogen, B represents the alkyl nucleus structure from diisocyanates of the group consisting of isophorone diisocyanate, 1,6-hexamethylene diisocyanate tetramethyl xylene diisocyanate, and methylene (cyclohexyl isocyanate), x is a number having an average value of about 1 to 60, $B_L$ is the nucleus structure derived from blocking agents of the group consisting of methyl ethyl ketone oxime, phenols, amides, malonates, acetoacetates or sodium bisulfite.

17. A flexible polyurea coating possessing improved properties in the areas of storage stability and compatibility prepared by reacting a urea-linked isocyanate prepolymer as in claim 16 and a polyoxyalkylene polyamine comprising JEFFAMINE® T-403.

* * * * *